United States Patent
Kowoll

(10) Patent No.: US 8,529,792 B2
(45) Date of Patent: Sep. 10, 2013

(54) PROCESS FOR THE PURIFICATION OF CRUDE GAS FROM SOLIDS GASIFICATION

(75) Inventor: Johannes Kowoll, Bochum (DE)

(73) Assignee: UHDE GmbH, Dortmund (DE)

( * ) Notice: Subject to any disclaimer, the term of this patent is extended or adjusted under 35 U.S.C. 154(b) by 0 days.

(21) Appl. No.: 12/733,910

(22) PCT Filed: Sep. 26, 2008

(86) PCT No.: PCT/EP2008/008194
§ 371 (c)(1),
(2), (4) Date: Aug. 12, 2010

(87) PCT Pub. No.: WO2009/043540
PCT Pub. Date: Apr. 9, 2009

(65) Prior Publication Data
US 2010/0311847 A1  Dec. 9, 2010

(30) Foreign Application Priority Data
Sep. 26, 2007  (DE) .......................... 10 2007 046 260

(51) Int. Cl.
*C01B 3/38* (2006.01)
*C01B 3/24* (2006.01)

(52) U.S. Cl.
USPC .......................................... 252/373; 423/650

(58) Field of Classification Search
USPC ....................................................... 252/373
See application file for complete search history.

(56) References Cited

U.S. PATENT DOCUMENTS

| | | | |
|---|---|---|---|
| 4,260,412 A | 4/1981 | Summers et al. | |
| 4,613,344 A | 9/1986 | Henrich et al. | |
| 4,776,388 A | 10/1988 | Newby | |
| 4,936,873 A | 6/1990 | Richard | |
| 4,978,368 A | 12/1990 | Richard | |
| 5,401,282 A | 3/1995 | Leininger et al. | |
| 5,567,228 A | 10/1996 | Abdulally | |
| 5,688,479 A * | 11/1997 | Chao | 423/240 S |
| 7,056,487 B2 | 6/2006 | Newby | |
| 2004/0247509 A1 * | 12/2004 | Newby | 423/240 S |

FOREIGN PATENT DOCUMENTS

| | | |
|---|---|---|
| DE | 31 01 291 A1 | 11/1981 |
| DE | 33 40 204 A1 | 5/1985 |
| DE | 34 39 600 A1 | 5/1986 |

(Continued)

*Primary Examiner* — Melvin C Mayes
*Assistant Examiner* — Kenneth Vaden
(74) *Attorney, Agent, or Firm* — Marshall & Melhorn, LLC

(57) ABSTRACT

A process and device is provided for the generation and purification of a crude gas for synthesis gas generation from a solid carbon-containing fuel by a coal gasification reaction. The fuel is mixed with a quenching medium directly after generation to dissipate the high internal energy and is then brought into contact with a solid basic alkaline earth metal compound or a sorbent consisting of a transition metal-containing compound just in the mixing chamber or downstream of the mixing chamber such that the acidic or basic or sulfur-containing or halogen-containing constituents contained in the crude gas and originating from the gasification reaction are absorbed. A solids-separating device downstream of the sorbent feed device removes the solid or solidified constituents from the system. The basic and transition metal-containing sorbent can be regenerated and returned to the process either in a mixture or after separation from the ash and slag constituents such that an energy-intensive cooling of the crude gas is not required for its purification and the synthesis gas thus purified can be used in a subsequent process without any further heating.

26 Claims, 2 Drawing Sheets

(56) References Cited

FOREIGN PATENT DOCUMENTS

| DE | 38 08 729 | A1 | 10/1989 |
| DE | 40 36 281 | C2 | 6/1995 |
| EP | 0 349 090 | A1 | 1/1990 |
| EP | 0 629 685 | A1 | 12/1994 |

* cited by examiner

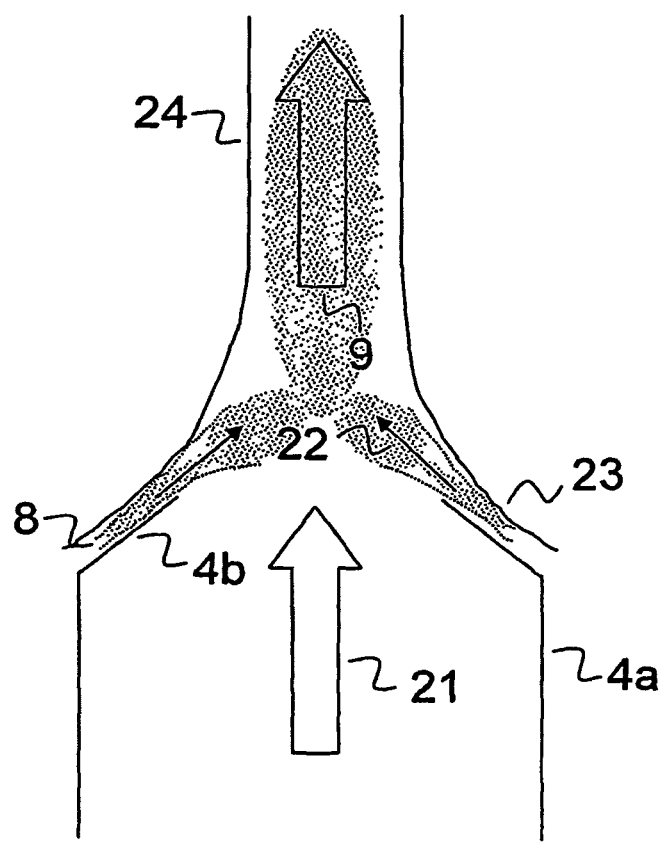

PROCESS FOR THE PURIFICATION OF CRUDE GAS FROM SOLIDS GASIFICATION

BACKGROUND OF THE INVENTION

The invention relates to a process for the purification of a dust-containing gas generated in a gasification reaction from solid carbon-containing materials by conversion with an oxygen-containing or water vapour-containing and oxygen-containing gas at an increased temperature, in which a crude gas is generated which mainly consists of carbon monoxide and hydrogen and the actual purification step is carried out by the addition of a solid sorbent to the hot gas stream immediately after production. The purified gas obtained is a synthesis gas which is used for chemical syntheses, for the recovery of hydrogen and the production of metals from metal ores by the direct reduction process.

The crude gas required for this process is normally generated at a temperature of 1200 to 2500° C. in a suitable reactor. There are several types and forms which may be used for this purpose. The solid carbon-containing material is normally filled into a reaction vessel equipped with feed devices for the fuel and the oxygen-containing reaction gas. In the gasification reaction, the crude gas and solid accompanying substances, which, depending on the fuel composition, normally consist of ash or slug, form in a chemical reaction. In a particularly advantageous embodiment of the reaction vessel the crude gas and the solid accompanying substances can leave the reactor by different process paths. The obtained crude gas will then still entrain smaller amounts of solid and liquefied accompanying substances.

The crude gas leaves the reactor and is directed to a reaction chamber where it is mixed with colder gas for dissipation of the high internal energy, thus being cooled down. This process is also known as quenching process and can be carried out in various types and modes. Generally, devices are used in which the crude gas is directed to a reaction chamber located downstream or upstream of the reactor, also called quench chamber, for being mixed with the colder gas and mixed with the gas. In this process, the liquefied slug particles entrained solidify and are conveyed further in the form of slug particles together with the crude gas. After the quenching process, the crude gas obtained is further purified, this purification process being of various types depending on the application of the synthesis gas.

From the generation of synthesis gas, a gas is obtained which mainly consists of carbon monoxide and hydrogen, but also of accompanying pollutants. Many of these pollutants are of a basic or acidic nature and are of corrosive effect. As the pollutants interfere with many purposes of further use, they must be removed from the generated crude gas. In the production of chemicals the corrosive constituents may affect plant sections or react with the chemicals such that the desired processes are impeded or suppressed. For many purposes the presence of sulphur-containing foreign substances is also problematic since these may enter into undesired chemical reactions. Thus in the production of iron by the direct reduction process, for example, a sulphur content of the synthesis gas is of great disadvantage since the sulphur impairs the reduction process and sulphides may form or remain in the pig iron.

The crude gas leaving the quench chamber has a temperature of 600° C. to 1000° C. depending on the feedstock and the production process. The gas is cooled down and purified for many purposes. However, this is very energy-intensive and involves high investment and current costs especially if the synthesis gas must be reheated for the subsequent application.

An example is the production of iron by the direct reduction process in which a synthesis gas, which mainly consists of hydrogen and carbon monoxide, is used for the production of pig iron by the reduction of iron ore. For this purpose, the synthesis gas must be used at high temperatures in order to efficiently reduce the iron ores. The production of iron by the direct reduction process is carried out frequently as this production method also allows the operation of small-scale plants which can thus produce at low cost. Chemical syntheses as well often require a hot synthesis gas.

When using synthesis gas for the reduction of metal ores it is necessary to provide a synthesis gas which is free from sulphur compounds and acidic halogen compounds. DE 3101291 A1 describes a process for the production of iron ore by the direct reduction process. Finely ground coal is converted to a reducing generator gas in a fluidised-bed gasification reactor in the presence of an oxygen-containing gas, the coal being provided with a solid sulphur acceptor prior to conversion. The hot and for the most part sulphur-free generator gas thus generated is used as a reduction gas for the production of sponge iron from iron ore in a direct reducing cupola. By returning the purified gas from the direct reducing cupola, the process mainly runs without any costly cooling and heating step of process gases. Limestone, for example, is used as sulphur acceptor and reacts in the reaction vessel during the gasification reaction with the acidic sulphur compounds contained in the coal.

When performing the coal gasification reaction at temperatures of more than 1200° C. there is the problem that the halogen and sulphur compounds decompose and react with hydrogen and carbon monoxide. In this reaction major part of the sulphur reacts to form hydrogen sulphide ($H_2S$) and carbonyl sulphide (COS). The halogen compounds mainly react to form the corresponding hydrogen halides. Generally, limestone is added to the reaction for the neutralisation of these substances.

The addition of limestone causes a considerable reduction in the flow temperature of most types of slag. The flow temperature of slag in normal gasification reactions can be 1200° C. or higher. The addition of limestone or similar minerals causes a reduction in the flow temperature down to between 500° C. and 600° C., the slag thus solidifying much later in the process and allowing to be withdrawn more easily. Consequently, the slagging gasifier can be cleaned at much prolonged intervals. For this method, the crude gas must be dedusted prior to adding the sorbent and sintering the slag in order to avoid clogging of the dust filters. For this reason, the crude gas obtained is normally cooled down to between 1000° C. and 600° C. first, then dedusted and in a subsequent step freed from sulphur compounds and halogens.

The aim of the invention is to provide a coal gasification process which runs without cooling of the quenched gas and nevertheless supplies a synthesis gas largely freed from by-products. The aim is to make it possible to provide the generated synthesis gas at a high temperature, without being prompted to use further process steps of cooling, purification and re-heating. The aim is further to provide easy purification and absorption of pollutants from the crude gas and without energy-intensive cooling. In addition the aim is to provide a synthesis gas which is as free from sulphur compounds as possible.

BRIEF SUMMARY OF THE INVENTION

The invention achieves the objective by adding a solid absorbent for acidic and sulphur-containing impurities to the crude gas obtained from the coal gasification process after the gasification process and during or immediately after the quench process. The process is especially suited for a coal gasification process in which the crude gas and the slag are separately discharged from the gasification reaction vessel such that, from the very beginning, the crude gas obtained contains only few admixed solid or liquefied foreign substances. The absorbent admixed may be any solid which, for the purpose of achieving the desired effect, is preferably of a basic nature. To facilitate an improved chemical absorption of non-acidic sulphur-containing gases from the obtained crude gas, metal salts may be admixed to the basic absorbent, especially iron ores showing the desired effect.

DETAILED DESCRIPTION OF THE INVENTION

The invention especially claims a process for the generation and purification of a crude gas comprising synthesis gas,
the crude gas being generated by the gasification of a solid carbon-containing material as a fuel gas composition with an oxygen-containing or water vapour-containing and oxygen-containing gas in a gasification reactor suited for this purpose, in which
a crude gas with a high internal energy is generated which on account of the fuel composition contains acidic or basic or sulphur-containing or halogen-containing gaseous pollutants, and
the crude gas may also contain dust, solid, ash-containing or slag-containing substances, and
the crude gas from the gasification reactor being fed as a gas stream to a reaction chamber located downstream or upstream, where a colder gas or an evaporated liquid or a liquid is added as a quenching medium, by which the synthesis gas can react to dissipate its high internal energy,
characterised in that
a colder gas and a solid sorbent or an evaporated liquid and a solid sorbent are added to the crude gas having a temperature of more than
1000° C., with the addition taking place outwardly directed from the gasification reactor in the direction of the crude gas stream, after the gasification process and during the addition of the colder gas or the evaporated liquid or the liquid as a quenching medium, and
at least part of the sorbent being chemically cracked during mixing with the hot crude gas such that it reacts within one second or less with the acidic or basic or sulphur-containing or halogen-containing substances and converts these substances to a solid and bound form, and
the mean temperature of the reacting crude gas ranging between 600° C. and 1000° C.

In a preferred embodiment of the invention the sorbent is added together with the gas for cooling. A suitable feeding point is the chamber immediately downstream of the outlet opening of the gasification reactor. The substance is advantageously fed in the form of smoke, the latter denoting a heterogeneous mixture of solid and gas. The smoke is formed by a mixture of solid sorbent and the gas or the water vapour for cooling the crude gas. When feeding the gas intended for cooling and the sorbent at the same time, the smoke is passed into the gas stream through an opening in the periphery of the gasification reactor outlet, the smoke thus being entrained by the crude gas stream and the sorbent contained therein being able to react with the pollutants contained in the crude gas. Generally, the sorbent quickly reacts with the water vapour. The smoke is distributed over the total gas stream by dispersion. If the smoke is admixed in the periphery, the cool smoke will protect the surrounding wall against the radiation heat of the generated crude gas, thus minimising the thermal loss of the crude gas.

In a further embodiment the sorbent is added separately from the gas or water vapour for cooling the crude gas, separate feed devices being provided for this purpose. In this case as well, a suitable feeding point is the chamber immediately downstream of the outlet opening of the gasification reactor. The smoke will not form until mixing the sorbent with the gases. In any case, the solid sorbent is preferably fed to the gas pneumatically. However, the feed device type is optional, for example, in the form of a belt conveyor.

All solid carbon-containing materials which can form a carbon monoxide-containing and hydrogen-containing crude gas by a gasification reaction with an oxygen-containing or a water vapour-containing and oxygen-containing gas are suited as solid carbon-containing fuels for the gasification reaction. The preferred fuel is coal or petroleum coke. It is also possible to use a preferably pre-treated cellulose-containing biological fuel. Examples are wood or pressed plant material.

Generally, the fed reaction gas consists of oxygen or water vapour and oxygen. But it may also contain other gases, carbon dioxide here being named as an example. The gasification reaction normally gives a crude gas which mainly consists of carbon monoxide, hydrogen or carbon dioxide and is suited for the generation of synthesis gas.

After the coal gasification reaction the crude gas obtained is mixed with a colder medium to dissipate the high internal energy. Typical media for running the quench process are cooled synthesis gas, returned process gases, water vapour, nitrogen or carbon dioxide. In a typical embodiment of the invention the crude gas thus obtained has a pressure of 0.3 to 7 MPa after having been mixed with the quench gas. The sorbent is fed to the quenched crude gas at this temperature such that the sorption process can achieve optimum efficiency. The reaction time of the absorption process is short and normally less than 1 second.

The sorbent to be added should have a solid and fine-grained, even powdery form, if required. A preferred grain size of the substance to be added is 1 to 0.01 mm and ideally 0.1 to 0.03 mm.

It is possible to admix the sorbent separately from the quenching medium. In such case the sorbent is injected with the aid of a transport gas. However, the sorbent may advantageously be injected into the quench chamber together with the quenching medium. For this purpose, the sorbent is mixed with the quenching medium or the foreign gas by means of suitable devices prior to the addition and then injected into the quench chamber together with the transport medium.

In a further embodiment of the invention the sorbent is fed to the cooled crude gas directly downstream of the quench chamber. The addition of sorbent to the cooled crude gas will especially be of advantage if the portion of impurities in the crude gas is lower because then a comparatively shorter reaction path is required.

As basic constituents the sorbent contains compounds which react quickly and in an intense manner with the admixed acidic and sulphur-containing constituents. Examples of such compounds are calcium carbonate and magnesium carbonate as single or multi-basic salts, dolomite or limestone being named as natural representatives of these salts. The salts may be used in natural or calcined form.

For the chemical absorption of sulphur-containing gas constituents transition metal-containing constituents may be admixed to the sorbents. Transition metal compounds frequently used are zinc salts or iron salts such as zinc spar or iron ore. A preferred transition metal additive for the absorption of sulphur compounds is iron oxide or iron ore. It is also possible to admix solid, oxidising substances to the sorbent, the said substances reacting with the sulphide-containing constituents to form sulphates and thus converting them to insoluble solid. Thus, calcium sulphide, for example, can be converted to easily separable and usable calcium sulphate. Examples of solid, oxidising sorbents are peroxides or persulphates.

It goes without saying that the medium to be used for quenching must not react with the sorbent. If the sorbent is added separately from the quenching medium, the transport medium must be inert against the sorbent. Typical acidic or basic accompanying gases from the gasification process are hydrogen sulphide ($H_2S$), carbonyl sulphide (COS), sulphur dioxide ($SO_2$), hydrogen chloride (HCl) or hydrogen fluoride (HF). The basic sorbent reacts with the acidic constituents to form calcium salts or magnesium salts depending on the composition. The transition metal-containing salts react with the hydrogen sulphide to form sulphides or hydrosulphides.

In a further embodiment of the invention the crude gas is also routed through a particle bed filled with the sorbent in the form of lumps such as pellets, for example. In such case, however, the particle bed must be cleaned or regenerated at periodic intervals to remove any fly ash constituents or cooled slag constituents retained in the particle bed. In addition, the sorbent must then be reactivated at periodic intervals by withdrawal and regeneration. To improve their handling properties, the particles in the particle bed should have a larger average particle size than the fly ash. The particles in the particle bed preferably have an average particle size of more than 0.2 mm.

The synthesis gas generated and purified according to the invention may be used for any purpose for which a purified synthesis gas is required. It is preferably used in the direct reduction of metal ores. However, other possible applications are the synthesis of chemicals or the provision of hydrogen. A subsequent process using the synthesis gas generated and purified according to the invention is also expressly claimed.

For some applications the crude gas obtained may be further used together with the reacted sorbent directly without any further purification step. Related examples are iron production processes by direct reduction based on low-sulphur iron especially if the content of the sorbent in the crude gas is low. However, in most cases, the synthesis gas or generator gas obtained is required in a state largely freed from solids. For this purpose, the solids thus obtained must be removed from the bound and absorbed pollutants entrained in the crude gas by another process step. Here, filtering devices may be used which are suitable for filtering solids from a gas.

Examples of suitable filtering devices are centrifugal separators, filter cartridges, filter cloths or electrostatic precipitators. To be able to fully exploit the thermal enthalpy of the crude gas in the process according to the invention, the filtering device should be designed such that the temperature of the obtained gas is only slightly changed by the solids purification process. The solid thus separated contains the laden sorbent and the ash constituents entrained from the coal gasification process and solidified slag particles.

In an embodiment of the invention, the solids separation process step is carried out after the quenching process and after the addition of the sorbent. It is also possible to repeat the separation of solids several times during the course of the process. This is especially advisable if the crude gas produced is extremely laden with solids on account of coal gasification. Solids separation may be carried out after the coal gasification reaction and another one after the addition of the sorbent. However, especially when using advantageous coal gasification reactors, solids separation is normally required only after the sorption process.

In another embodiment of the invention, the sorbent is directly fed to the solids separation process. This is especially of advantage if the pollutants entrained in the crude gas and to be absorbed are of solid or solidified form. In such case, the sorption process is carried out in the solids separator and the sorbed constituents are withdrawn from the process together with the other constituents. The addition of the sorbent will cause the sinterability of the fly ash to decrease so that it is possible to use separators at considerably higher temperatures.

After withdrawal, the solid separated is, in most cases, decomposed into its constituents. There are various processes available for this purpose, for example, the use of classifying devices. One obtains the solid or solidified by-products in the form of ash or slag and the reacted sorbent or a particle fraction mainly containing the reacted sorbent. The ash and slag may be used for other applications or be disposed of. The sorbent may be used for other applications by suitable regeneration processes. Examples of suitable regeneration processes are washing, drying and calcining. Suitable steps for the regeneration of the solid sorbent may also be hydrogenation steps, the bound sulphur being able to be removed as hydrogen sulphide. The basic sorbent may also be regenerated by passing a water vapour-containing or oxygen-containing gas over it.

The sorbent thus regenerated may be returned to a new sorption process. The sorbent may also be re-used in the coal gasification reaction. For this purpose, it is either fed directly to the coal gasification reactor or to the fuel pre-treatment unit. For this, the sorbent is, for example, ground or dried with the fuel. However, the sorbent may also be fed to a subsequent process.

The addition of sorbents causes the flow temperature of most slag types to decrease so that it will be possible to reduce the gasification or smelting temperature and increase the gasification or smelting efficiency. If the subsequent process is, for example, the production of iron by a direct reduction process, the sorbent may act as slag former after regeneration in the iron production and be of favourable effect on the smelting process. Depending on its characteristics, the subsequent process itself may produce a solid-laden gas which, in an advantageous embodiment, is re-fed to a solids separator and purified. The solid thus obtained may be combined with the separated solid from the coal gasification reaction and also be fed to the applications mentioned.

In the case of correct metering, the reacted sorbent is normally laden to such an extent that regeneration will be inevitable if the sorbent is to be re-used. However, if the sorbent is laden to a minor extent only because clean coal, for example, is used, it will be possible to re-use major part of the sorbent without regeneration. The sorbent is subsequently used for the same purposes as the regenerated sorbent as, for example, for re-use in the coal gasification process or for use in a subsequent process. Prior to re-use, the sorbent may also be ground or dried as required by the process.

The invention also claims a device suitable for carrying out the process according to the invention. The invention especially claims a device for carrying out the process according to the invention,
consisting of a refractory reaction vessel which is suitable for the gasification of solid carbon-containing fuels by conversion with an oxygen-containing or water vapour-containing and oxygen-containing gas, and a reaction chamber being located downstream of the reaction vessel and equipped with feed devices for a solid sorbent and gaseous or vaporous substances for cooling the crude gas, and the feed device for the solid sorbent and the gaseous and vaporous substances is configured as at least one opening which opens outwardly from the gasification device in direction of the gas stream and comprises devices with the aid of which the sorbent in a mixture with the cooling gas can be fed and introduced by pressure to the product gas stream.

The opening for adding the solid sorbent is designed in such a way that the sorbent is added to the crude gas stream in direction of flow. If the sorbent is added in the form of a smoke together with the crude gas, the opening must also be designed in such a way that the smoke is added in direction of flow. On the inner wall of the gasification device, the opening is preferably designed as a slot, but it may also be a collar or an annular nozzle. The design is optional to facilitate that the smoke or sorbent is added to the crude gas stream in direction of flow.

On the outer wall, the opening is provided with feed devices for feeding the sorbent to the gas stream. The solid sorbent is preferably fed to the gas stream pneumatically such that the gas stream can be atomised. However, any device is suitable which facilitates the addition of the sorbent to the crude gas stream in a smoke-like or almost smoke-like form. The device according to the invention for the pneumatic feeding of the sorbent may also be designed, for example, as spraying devices, screw conveyers or Humphrey pumps.

The device claimed also includes a gasification reactor equipped with at least one opening for the separate discharge of the solid reaction product and at least another opening for the separate discharge of the gaseous reaction product. Thus, a crude gas may be obtained which is suitable for the generation of synthesis gas or generator gas and is almost free of ash or slag constituents. In a preferred embodiment, the gasification reactor is provided with a separate opening for the discharge of the slag and the other solids obtained which are then used for other applications or disposed of. In a preferred embodiment, the gasification reactor has a separate opening for the discharge of the crude gas, special devices being provided to ensure that most part of the crude gas contains as few slag or ash constituents as possible. To obtain a form of fuel suitable for the gasification reaction, the device according to the invention may include mills, driers or fluidised-bed facilities for fuel pre-treatment.

The actual reactor for carrying out the gasification reaction is followed by a downstream or upstream reaction chamber which is used for mixing the crude gas with a quenching medium to dissipate the high internal energy after the gasification process. For the performance of this quenching process the reaction chamber is equipped with nozzles for introducing the quenching medium and the sorbent. If the sorbent is fed to the quench chamber after the addition of the quenching medium, the quench chamber will additionally be equipped with injection or feed devices for introducing the sorbent.

Irrespective of the feeding point, the nozzles are advantageously provided with a mixing device for the addition of the solid sorbent to the gas or vapour stream. The nozzles are also equipped with a suitable sorbent feed device upstream of the mixing device. These devices may be, for example, screw conveyers or pneumatic plug conveyers. Depending on the sorbent feeding point, the sorbent injection or conveying devices may also be provided in the process flow downstream of the quench chamber or in a downstream solids separator. To obtain a form of sorbent suitable for the gasification reaction, the device according to the invention may include mills, driers or fluidised-bed facilities for sorbent pre-treatment.

In an embodiment of the invention, the device is equipped with a solids separator to which the crude gas is fed after the reaction with the sorbents and in which the solid constituents are filtered out of the gas. The device may include other process equipment which allows, for example, treatment of the separated solids. This includes, for example, classifying facilities such as sifting or screening devices able to separate ash or slag constituents from the reacted sorbent.

Solids separators especially suitable are centrifugal separators, also called cyclones. Suitable solids separators may also be temperature-resistant cloth filters, ceramic filter elements, filter cartridges or an electrostatic precipitator. The solids separation process step normally takes place directly downstream of the quenching and sorption step. The solids-laden hot crude gas may also be piped to the solids separation process step. Solids separation may also be carried out by means of filtration. This process step is preferably performed before adding the sorbent as otherwise the sintering temperature of the slag would decrease and the slag clog the filtering devices.

The device may also consist of process equipment which allow regeneration of the sorbent after separation of the solids from this sorbent. Such process equipment may be, for example, wash boilers or drying and calcining devices. Generally, such device parts are located in the process flow downstream of the quench chamber and of the solids separator. In a preferred embodiment of the invention, the regenerated sorbent is returned to the coal gasification process by means of suitable devices, taking place either at the fuel pre-treatment point or directly into the coal gasification reactor.

The device for carrying out the process according to the invention may also include facilities which allow further use of the sorbent in a subsequent process. If in this subsequent process a solid-laden gas is produced, the device according to the invention may also include process equipment for solids separation and return of the separated solids.

In another embodiment of the invention, the gas obtained from the quenching process may be subjected to a scrubbing process using a scrubbing liquid before and after solids separation. Thus, the crude gas entraining solids or a laden sorbent may preferably be scrubbed with water to remove any laden sorbent or solid from the crude gas by scrubbing. However, the laden crude gas may also be purified using other scrubbing liquids suitable for gas scrubbing processes. Examples of frequently used scrubbing liquids are ethanol amines or alkylated polyalkylene glycols.

The invention facilitates an efficient and quick purification of a synthesis gas or generator gas from a coal gasification process by adding a solid sorbent directly after the coal gasification reaction. By a quick reaction of the admixed sorbent with the crude gases containing acidic or sulphur-containing or halogen-containing substances or a combination of the latter, it is possible to remove these interfering substances from the crude gas. Consequently, it is not necessary to carry out the energy-intensive and time-consuming scrubbing process connected with cooling and the subsequent gas re-heating. The obtained sorbent may be re-used or regenerated at low cost.

The embodiment of a device for the gasification of solid fuels according to the invention is detailed by two drawings, the process according to the invention not being restricted to this embodiment.

FIG. 2 shows a device according to the invention for the addition of a solid sorbent to the crude gas stream of a gasification reaction.

Figure 1:
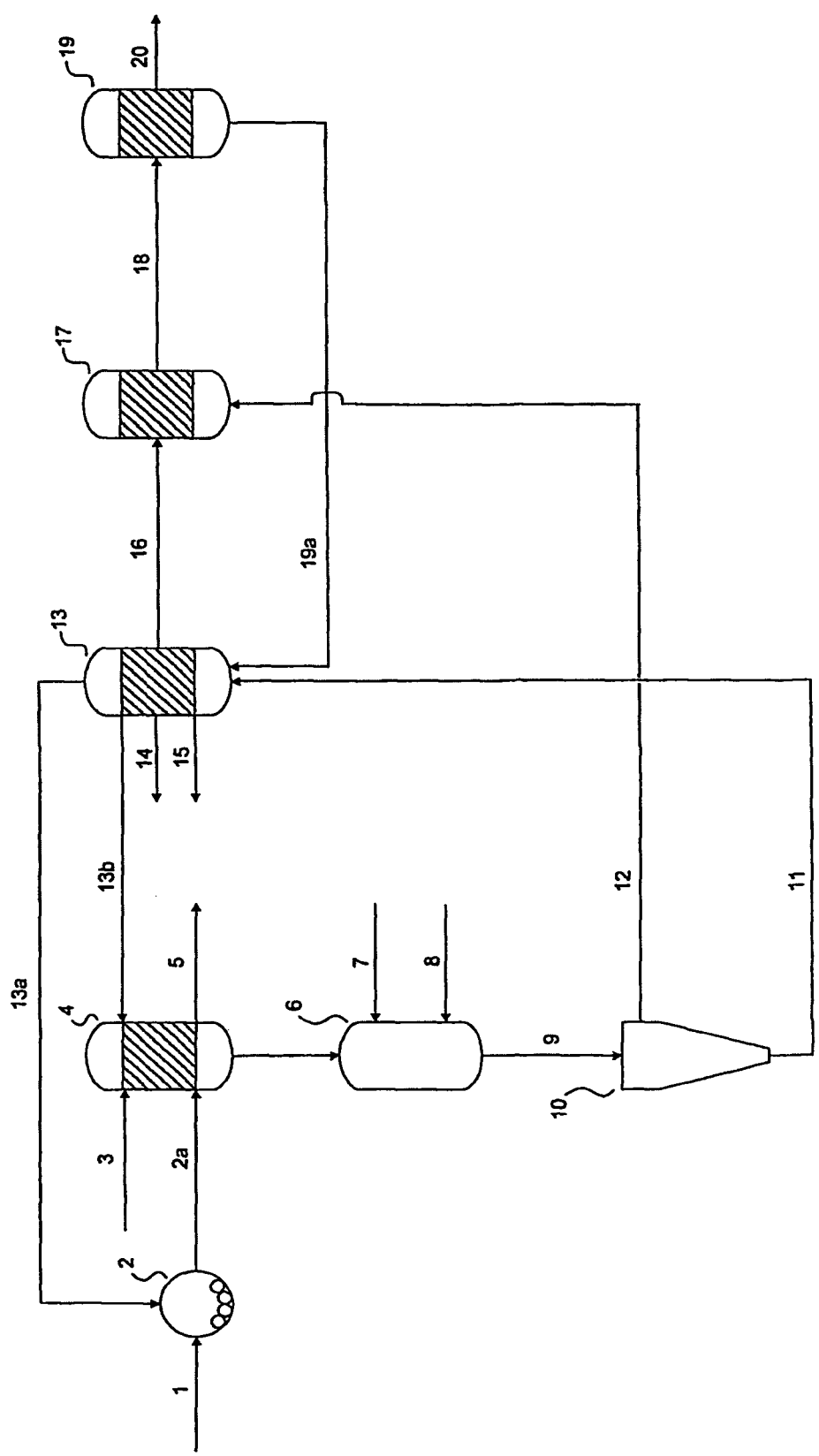
FIG. 1 shows a process flow according to the invention for carrying out a process with the addition of a solid sorbent to a crude gas stream of a gasification reaction.

FIG. 1 shows a very simplified flow diagram for carrying out the process with the addition of the sorbent to the crude gas stream into the mixing chamber during quenching. The solid carbon-containing fuel (1) is fed to a device for grinding and drying (2) for the preparation of the gasification process. The small-sized or fine-grained fuel thus obtained is fed to a gasification reactor via suitable conveying devices (2a). Via another feed line and injection devices an oxygen-containing or water vapour-containing and oxygen-containing reaction gas (3) is fed to the gasification reactor (4) where the actual gasification reaction for the generation of synthesis gas takes place. In an advantageous embodiment, the reactor (4) is equipped with a separate discharge device for solid and liquefied gasification products, the said device allowing discharge of the slag obtained from the gasification process together with the other solid constituents from the reactor (5) separately from the crude gas. The crude gas obtained is routed from the reactor in a vertical downward flow to a mixing or quench chamber (6). The mixing or quench chamber may also be designed to be connected to the reactor. In the quench chamber the hot crude gas is mixed with a colder foreign gas (7) for dissipating the high internal energy. Fresh sorbent (8) is fed to the quench chamber where it reacts with the pollutants contained in the crude gas. The cooled and sorbent-laden gas is routed via a pipe (9) to a deduster or solids separator (10), e.g. a cyclone. There, the coarse and solid constituents of the crude gas are separated such that the solids can be directed to the solids treatment unit (13) where the said solid constituents mainly consisting of solidified slag, laden sorbent and ash are separated. The ash and the slag are discharged (14) from the process. The sorbent is regenerated by means of suitable processes and also withdrawn from the process (15). Depending on the sorbent load, the sorbent may be re-mixed with the fuel (13a) during pre-treatment and fed to the gasification reaction (2a). If the sorbent is of adequate quality, it may also be directly fed to the gasification reactor (13b). The dedusted crude gas (12) from the coal gasification reaction is fed to the subsequent process (17) where it is used in various processes. Depending on its characteristics, the laden sorbent may be used in the subsequent process (16). During the course of the subsequent process, part of the gas is consumed whereas the sorbent changes only slightly. The residual solids-containing or dust-containing gas (18) is subjected to re-purification by solids separation (19). Depending on its characteristics and concentration the solid material thus obtained may be fed to the solids regeneration process (19a). If the concentration is higher, the sorbent-laden solid will be discharged after use in the subsequent process (20). In another embodiment of the invention, the fresh sorbent (8) is fed to the process directly downstream of the mixing or quench chamber or to the solids separator, the remaining plant configuration requiring hardly any changes.

FIG. 2 shows the outlet opening of a gasification reactor (4a) through which the crude gas stream (21) is discharged from the gasification reactor in upward direction. The crude gas passes a narrow part (4b) which increases the gas stream velocity. Downstream of the narrow part, there is an opening (23) through which the solid sorbent (8) is introduced together with an inert gas in the form of a smoke (22). The smoke is entrained by the crude gas (9), having a purification effect. The smoke is entrained by the purified crude gas along the crude gas discharge pipe (24).

LIST OF REFERENCE NUMBERS AND DESIGNATIONS

1 Fuel feed
2 Grinding and drying
2a Feed of ground fuel
3 Reaction gas
4 Gasification reactor
4a Outlet opening of a gasification reactor
4b Narrow part in the outlet opening of the gasification reactor
5 Solids discharge (ash and slag)
6 Mixing chamber (quench chamber)
7 Foreign gas feed
8 Solid sorbent
9 Crude gas laden with solids
10 Solids separator
11 Solids discharge
12 Purified crude gas or synthesis gas
13 Solids treatment unit
13a Solids return to the fuel pre-treatment unit
13b Solids return to the gasification reactor
14 Discharge of solid, laden sorbent
15 Slag discharge
16 Solids feed to subsequent process
17 Subsequent process
18 Process outlet gas
19 Solids purification of process outlet gas
19a Solids regeneration of process outlet gas
20 Dedusted process outlet gas
21 Crude gas stream
22 Smoke made up of solid sorbent and crude gas
23 Opening
24 Crude gas discharge pipe

The invention claimed is:
1. A process for the generation and purification of a dust-containing crude gas comprising synthesis gas:
the crude gas being generated by the gasification of a solid carbon-containing material as a fuel composition with an oxygen-containing or water vapour-containing and oxygen-containing gas in a gasification reactor suited for this purpose, in which:
a crude gas with a high internal energy is generated which on account of the fuel composition contains acidic or basic or sulphur-containing or halogen-containing gaseous pollutants, and
the crude gas may also contain dust, solid, ash-containing or slag-containing substances, and
the crude gas from the gasification reactor is fed as a gas stream to a reaction chamber located downstream or upstream, where a colder gas or an evaporated liquid or a liquid is added as a quenching mechanism by which the crude gas can react to dissipate its high internal energy, wherein
a colder gas and a solid sorbent or an evaporated liquid and a solid sorbent are added to the crude gas having a temperature of more than 1000° C., with the addition taking place outwardly directed from the gasification reactor in the direction of the crude gas stream, after the gasification process and during the addition of the colder gas or the evaporated liquid or the liquid as a quenching medium, and
at least part of the sorbent being chemically cracked during mixing with the hot crude gas such that it reacts within one second or less with the acidic or basic or sulphur- containing or halogen-containing substances and converts these substances to a solid and bound form, wherein the mean temperature of the reacting crude gas ranges between 600° C. and 1000° C.

2. The process according to claim 1, wherein the gas or the evaporated liquid for cooling the crude gas and the solid sorbent are admixed in a common stream in the form of smoke, the latter denoting a heterogeneous mixture of solid particles and gas.

3. The process according to claim 2, wherein the smoke is admixed in the periphery of the crude gas stream.

4. The process according to claim 3, wherein the crude gas consists essentially of carbon monoxide and hydrogen.

5. The process according to claim 1, wherein the generated crude gas has a pressure of 0.3 to 7 MPa after having been mixed with the quenching medium.

6. The process according to claim 1, wherein the solid carbon-containing material for the gasification reaction comprises coal, petroleum coke or a cellulose-containing biological fuel.

7. The process according to claim 1, wherein the carbon containing material as fuel is subjected to grinding or drying prior to conversion to obtain a form suitable for the gasification reaction.

8. The process according to claim 1, wherein the solid sorbent contains basic calcium compounds, basic magnesium compounds or transition metal-containing compounds.

9. The process according to claim 8, wherein the sorbent contains limestone, calcined limestone or dolomite.

10. The process according to claim 9, wherein the sorbent contains iron ore or iron oxides.

11. The process according to claim 8, wherein the sorbent contains solid, oxidising constituents reacting with the sulphide-containing constituents to form sulphates.

12. The process according to claim 8, wherein the solid sorbent has a grain size of 0.01 to 1 mm.

13. The process according to claim 1, wherein the solids consisting of fly ash, slag and laden sorbent contained in the crude gas, which is obtained when the colder gas and a solid sorbent or an evaporated liquid and a solid sorbent is added to the crude gas, is discharged from the crude gas containing the solid by a solids separator partially or completely.

14. The process according to claim 13, comprising, after its separation and discharge from the crude gas by the solids separator, solid removed from the crude gas and consisting of fly ash, slag and laden sorbent is returned to the process for the gasification of the solid carbon-containing material as a fuel without any classification.

15. The process according to claim 13, wherein after its separation and discharge from the crude gas by the solids separator, solid removed from the crude gas and consisting of fly ash, slag and laden sorbent is withdrawn or passed to be used in another process.

16. The process according to claim 13, wherein after its separation and discharge from the crude gas by the solids separator, the solid removed from the crude gas and consisting of fly ash, slag, and laden sorbent is subjected to classification, thereby obtaining the solid or solidified slag and ash constituents and the laden sorbent.

17. The process according to claim 16, wherein the laden sorbent removed from the crude gas and separated from the fly ash and the slag is returned to the process for the gasification of a solid carbon-containing material.

18. The process according to claim 16, wherein the laden sorbent obtained from the solids classification is fed to a regeneration unit for obtaining a regenerated solvent.

19. The process according to claim 18, wherein the regeneration of the laden sorbent includes washing, drying or calcining.

20. The process according to claim 18, wherein the laden sorbent is regenerated by passing an oxygen-containing or water vapour-containing and oxygen-containing gas over it.

21. The process according to claim 18, wherein the regenerated sorbent removed from the crude gas and separated from the fly ash and the slag is returned to the process for the gasification of a solid-containing material.

22. The process according to claim 18, wherein the regenerated sorbent removed from the crude gas and separated from the fly ash and the slag is withdrawn to be used in another process.

23. The process according to claim 16, wherein after its separation and discharge from the crude gas by the solids separator, the solid removed from the crude gas consisting of fly ash, slag and laden sorbent is separated by classification, and the laden sorbent and the residual solid are withdrawn or passed to be used in another process.

24. The process according to claim 1, wherein the hot crude gas is subjected to a solids separation process step prior to the addition of the solid sorbent.

25. The process according to claim 1, wherein the hot crude gas is passed through a particle bed filled with solid sorbent in addition to feeding a solid sorbent.

26. The process according to claim 1, wherein using the crude gas freed from foreign gases is re-used for the reduction of metal ores, the recovery of hydrogen or for chemical synthesis purposes.

* * * * *